J. E. CAMATTE.
INSULATING BUSHING.
APPLICATION FILED MAR. 11, 1910.
1,032,878.
Patented July 16, 1912.
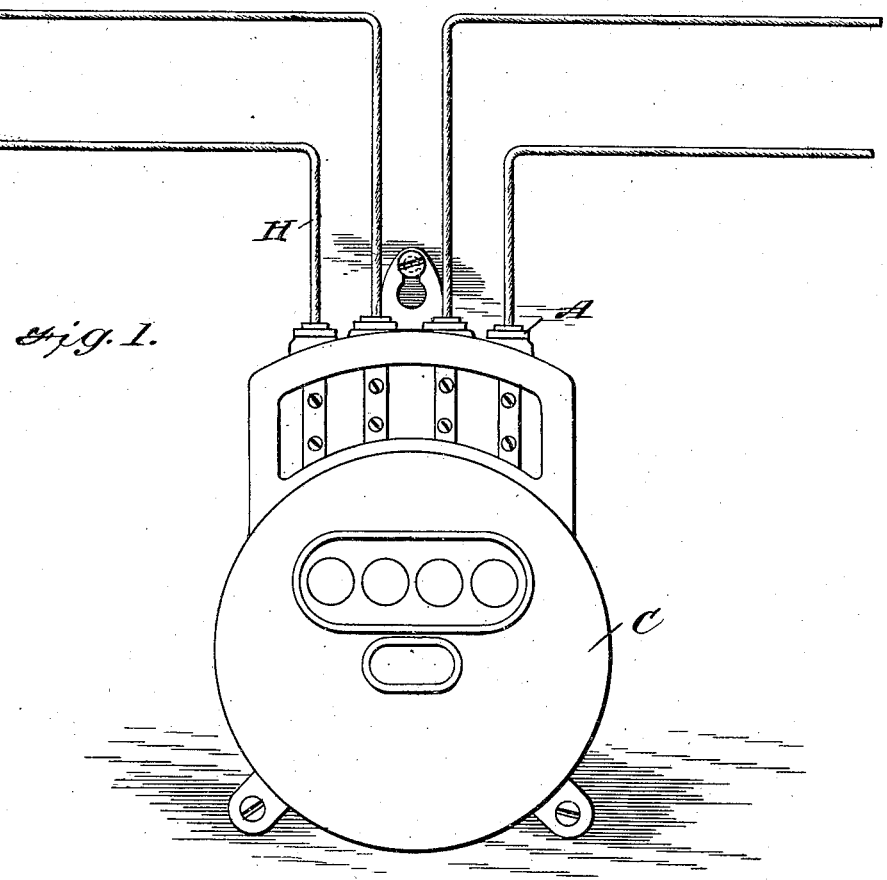
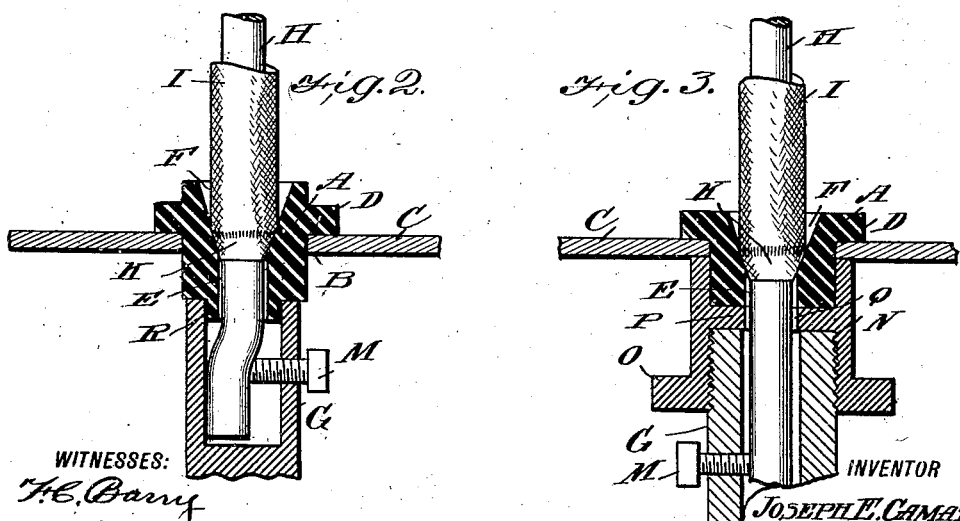
WITNESSES:
INVENTOR
JOSEPH E. CAMATTE
BY Munn & Co
ATTORNEYS

UNITED STATES PATENT OFFICE.

JOSEPH E. CAMATTE, OF LAUREL, MISSISSIPPI, ASSIGNOR TO AMERICAN TELEPHONE AND TELEGRAPH COMPANY, A CORPORATION OF NEW YORK.

INSULATING-BUSHING.

1,032,878.

Specification of Letters Patent.

Patented July 16, 1912.

Application filed March 11, 1910. Serial No. 548,557.

*To all whom it may concern:*

Be it known that I, JOSEPH E. CAMATTE, a citizen of the United States, and a resident of Laurel, in the county of Jones and State of Mississippi, have made certain new and useful Improvements in Insulating-Bushings, of which the following is a specification.

My invention is an improvement in insulating bushings, and consists in certain novel constructions and combinations of parts, hereinafter described and claimed.

The object of the invention is to provide a bushing of the character specified, for use with meters and wires, to prevent any possibility of contact with the wire after it is connected with the meter terminals, in order to prevent bridging to deflect a portion or all of the current from the meter.

Referring to the drawings forming a part hereof, Figure 1 is a front view of a meter with the improved bushings in place, Fig. 2 is a longitudinal section of the bushing with one form of meter, and Fig. 3 is a similar view with another form.

As is known, the meter in ordinary use for measuring the quantity of current used by the consumer, may be tampered with by those dishonestly inclined, the usual method being by bridging in a connection in such manner that the current will not pass through the meter, or at least only a portion thereof. The method of bridging usually followed is that of connecting the terminals of the line at the point where they connect with the meter, thus shunting a portion of the current from the meter, and affecting the reading to a considerable extent, depending of course upon the resistance of the wire. To render such bridging or shunting impossible without detection, I provide a bushing A of suitable form and size, of fiber or other suitable insulating material, which is inserted in an opening B, in the meter case C. The bushing is provided with an annular flange or rib D, engaging the outer surface of the case, to make a tight closure, and to limit the inward movement of the bushing.

The bushing is provided with a substantially cylindrical bore E, and the said bore at its outer end is made tapering, or frusto-conical, increasing gradually in cross section from within outward as at F. The bushing is so arranged with respect to the meter that the terminal G of the meter will abut the inner end thereof, and the wire H, passes through the bushing and into the terminal. The diameter of the inner end of the bore is practically the diameter of the wire, so that the said wire fills the bore, but loosely enough to permit its easy insertion and withdrawal. The insulation I of the wire is cut away in conical form as at K, to fit the inner end of the tapering portion tightly, and the set screw M of the terminal engages the denuded portion of the wire.

The tapering or frusto-conical portion of the bore is of sufficient length to prevent access to the denuded portion of the wire, and the insulation I coöperates with the said portion to form a seal for the same purpose. All of the wires connected with the meter are treated in the same manner, and it will be evident that the insulation must be cut to reach the wire, and this would be a sufficient notice that the device has been tampered with.

It will be obvious that the exterior shape and the size of the bushing may vary within wide limits, the essential feature being the seal formed between the insulation and the bushing, and the protecting flange rising above the seal, and encircling that portion of the wire that has not been denuded.

The bushing may be inserted in the case of the meter at any time, either before or after installation, and in any form of meter. Figs. 2 and 3 show meters of different construction, but the bushing is essentially the same in each case. In Fig. 3, the opening B of the meter case is encircled by a sleeve N in which the inner end of the bushing is received. The upper or outer end of the sleeve abuts the inner face of the case, and the lower end is provided with an external annular flange O. The sleeve is also provided with a diaphragm P having a central opening Q, through which the wire H extends, and the inner end of the bushing engages the upper face of the diaphragm, while the terminal G of the meter engages the lower face.

In Fig. 2 the bushing is provided with a reduced portion R which is received in the end of the terminal, and the shoulder S formed between the reduced portion and the main portion abuts against the end of the terminal. It will be evident that in both constructions the insulation must be tampered with to gain access to the wire.

I claim:

1. An insulating bushing provided with an external annular flange, the bore of the bushing being adapted to receive the denuded wire and gradually increasing in cross section from approximately the longitudinal center of the bore toward one end for receiving the insulation and the wire.

2. An insulating bushing having a bore gradually increasing in cross section from approximately the longitudinal center of the bore toward one end, for the purpose specified.

3. An insulator, comprising a body, a plug and a shoulder between the body and plug, a channel centrally through the body and plug consisting of a duct for accommodating an insulated section of a conductor, a duct to accommodate a trimmed section and a seat between the insulated and trimmed sections, substantially as described and for the purposes set forth.

JOSEPH E. CAMATTE.

Witnesses:
STEWART M. JONES,
JOHN J. MUNDELL.